United States Patent
Krovi (10) Patent No.: US 10,631,394 B2
(45) Date of Patent: Apr. 21, 2020

(54) NON-LINEAR OPTICAL SIMULATOR FOR COLLISIONAL PLASMAS

(71) Applicant: Raytheon BBN Technologies Corp., Cambridge, MA (US)

(72) Inventor: Hari Kiran Krovi, Lexington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 16/135,771

(22) Filed: Sep. 19, 2018

(65) Prior Publication Data
US 2020/0092975 A1    Mar. 19, 2020

(51) Int. Cl.
| | |
|---|---|
| *H05H 1/00* | (2006.01) |
| *G01N 15/14* | (2006.01) |
| *G01N 15/02* | (2006.01) |
| *G01N 15/06* | (2006.01) |
| *G01N 15/00* | (2006.01) |

(52) U.S. Cl.
CPC .......... *H05H 1/0018* (2013.01); *G01N 15/02* (2013.01); *G01N 15/06* (2013.01); *G01N 15/1434* (2013.01); *G01N 2015/035* (2013.01); *G01N 2015/0693* (2013.01); *G01N 2015/1447* (2013.01); *G01N 2015/1454* (2013.01)

(58) Field of Classification Search
CPC ...... H05H 1/0018; G01N 15/02; G01N 15/06; G01N 15/1434; G01N 2015/035; G01N 2015/0693; G01N 2015/1447; G01N 2015/1454

USPC ................................................. 356/335–343
See application file for complete search history.

(56) References Cited

U.S. PATENT DOCUMENTS

2019/0246484 A1    8/2019    Krovi

OTHER PUBLICATIONS

Hall et al. "Statistical theory for incoherent light propagation in nonlinear media", Physical Review E (2002), vol. 65, No. 3, pp. 035602-1-4.
Dylov et al. "Observation of All-Optical Bump-on-Tail Instability", Physical Review Letters (2008) vol. 100, No. 10, pp. 103903-1-4.
Martinez et al., "Negative Group-Velocity Dispersion Using Refraction", Journal of the Optical Society of America, vol. 1, No. 10, 1984, pp. 1003-1006.

(Continued)

*Primary Examiner* — Tri T Ton
(74) *Attorney, Agent, or Firm* — Lando & Anastasi, LLP (57) ABSTRACT

A system for modeling a collisional plasma particles distribution is provided. The system includes an input beam generator configured to generate an input beam having a first set of values of a parameter modelling an initial distribution of particles in a collisional plasma, a non-linear optical medium configured to receive the input beam and produce a complex response function in response to receiving the input beam, an output detector configured to detect a second set of values of the parameter responsive to propagation of the input beam through the non-linear medium to the output detector, a feedback module configured to modify one or more properties of the non-linear optical medium, and a controller configured to select the first set of values, receive the second set of values, and determine, based on the first set and the second set of values, a final distribution of the particles in the collisional plasma.

20 Claims, 4 Drawing Sheets

(56) References Cited

OTHER PUBLICATIONS

Tien et al., "Adjustable Negative Group-Velocity Dispersion in Graded-Index Lenses", Optical Letters, vol. 17, No. 17, 1992, pp. 1177-1179.

Bigelow et al., "Superluminal and Slow Light Propogation in A Room-Temperature Solid", Science, vol. 301, No. 200, 2003, pp. 200-202.

NON-LINEAR OPTICAL SIMULATOR FOR COLLISIONAL PLASMAS

GOVERNMENT INTEREST STATEMENT

This invention was made with government support under Contract Number HR0011-17-C-0022 awarded by the Defense Advanced Research Projects Agency (DARPA). The government has certain rights in the invention.

BACKGROUND

Plasma is a highly-conductive state of matter resembling an ionized gas. Plasma includes positive ions, which are relatively heavy, and free electrons, which are relatively light and which have become unbound from the positive ions. Although the positive ions remain relatively static, the free electrons move about the plasma freely in response to magnetic and electric fields applied to the plasma. Plasmas are of significant interest at least because, unlike other states of matter, the movement and distribution of plasma particles is dominated by the effects of magnetic and electric fields.

SUMMARY OF THE INVENTION

Aspects and embodiments are generally directed to an optical system for modeling a distribution of collisional plasma particles, the system comprising an input beam generator configured to generate an input beam having a first set of values of at least one parameter, the first set of values of the one or more parameters modelling an initial distribution of particles in a collisional plasma, a non-linear optical medium configured to receive, from the input beam generator, the input beam, the non-linear medium being configured to produce a complex response function in response to receiving the input beam, an output detector configured to detect a second set of values of the at least one parameter responsive to propagation of the input beam through the non-linear medium to the output detector, a feedback module coupled to the non-linear optical medium and configured to modify one or more properties of the non-linear optical medium, and a controller configured to select the first set of values of the at least one parameter, communicate the first set of values of the at least one parameter to the input beam generator, receive, from the output detector, the second set of values of the at least one parameter, and determine, based on the first set of values of the at least one parameter and the second set of values of the at least one parameter, a final distribution of the particles in the collisional plasma.

In one embodiment, the at least one parameter includes at least one of a phase of the input beam and an amplitude of the input beam. In an embodiment, the controller is further configured to select a first set of values of a feedback parameter and provide, to the feedback module, the first set of values of the feedback parameter. In at least one embodiment, the feedback module includes a pump beam generator configured to generate a pump beam, and provide the pump beam to the non-linear optical medium to modify the complex response function of the non-linear optical medium.

In some embodiments, the feedback parameter includes a frequency of the pump beam generated by the pump beam generator. In an embodiment, the feedback parameter includes a field intensity of the pump beam generated by the pump beam generator. In one embodiment, the feedback module includes a foreign atom injector configured to inject foreign atoms into the non-linear optical medium to modify the complex response function of the non-linear optical medium. In some embodiments, the feedback parameter is indicative of a distribution of foreign atoms in the non-linear optical medium.

According to one aspect, a method of modeling a distribution of collisional plasma particles is provided, comprising selecting a first set of values of one or more parameters of an input beam, the one or more parameters modelling an initial distribution of particles in a collisional plasma, communicating the first set of values of the one or more parameters to an input beam generator, generating, by the input beam generator based on the first set of values of the one or more parameters, an input beam, providing, by the input beam generator, the input beam to a non-linear optical medium configured to produce a complex response function in response to receiving the input beam, propagating the input beam through the non-linear optical medium, detecting a second set of values of the one or more parameters of the input beam responsive to propagation of the input beam through the non-linear optical medium, analyzing the first set of values of the one or more parameters and the second set of values of the one or more parameters, selecting, based on the analyzing, a first set of values of a feedback parameter, providing the first set of values of the feedback parameter to a feedback module to modify a complex response function of the non-linear optical medium, and modelling, based on the analyzing, a final distribution of the particles in the collisional plasma.

In one embodiment, the one or more parameters include at least one of a phase of the input beam and an amplitude of the input beam. In an embodiment, the method further comprises generating, based on the first set of values of the feedback parameter, a pump beam, and providing the pump beam to the non-linear optical medium to modify the complex response function of the non-linear optical medium. In some embodiments, the feedback parameter includes a frequency of the pump beam.

In one embodiment, the feedback parameter includes a field intensity of the pump beam. In some embodiments, the method further includes injecting, based on the first set of values of the feedback parameter, foreign atoms into the non-linear optical medium to modify the complex response function of the non-linear optical medium. In an embodiment, the feedback parameter is indicative of a distribution of foreign atoms.

According to one aspect, a non-transitory computer-readable medium storing sequences of computer-executable instructions for modeling a distribution of collisional plasma particles is provided, the sequences of computer-executable instructions including instructions that instruct at least one processor to select a first set of values of one or more parameters of an input beam, the one or more parameters modelling an initial distribution of particles in a collisional plasma, communicate the first set of values of the one or more parameters to an input beam generator to control the input beam generator to generate, based on the first set of values of the one or more parameters, the input beam, control the input beam generator to provide the input beam to a non-linear optical medium configured to produce a complex response function in response to receiving the input beam, detect a second set of values of the one or more parameters of the input beam responsive to propagation of the input beam through the non-linear optical medium, analyze the first set of values of the one or more parameters and the second set of values of the one or more parameters, select a first set of values of a feedback parameter, provide the first set of values of the feedback parameter to a feedback module to modify a complex response function of the non-linear optical medium, and model, based on the analyzing, a final distribution of the particles in the collisional plasma.

In one embodiment, the sequences of computer-executable instructions further include instructions that instruct the at least one processor to generate, based on the first set of values of the feedback parameter, a pump beam, and provide the pump beam to the non-linear optical medium to modify the complex response function of the non-linear optical medium. In an embodiment, the feedback parameter includes at least one of a frequency of the pump beam and a field intensity of the pump beam. In embodiments, the sequences of computer-executable instructions further include instructions that instruct the at least one processor to control the feedback module to inject, based on the first set of values of the feedback parameter, foreign atoms into the non-linear optical medium to modify the complex response function of the non-linear optical medium. In at least one embodiment, the feedback parameter is indicative of a distribution of foreign atoms.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

As discussed above, plasma consists of positive ions and free electrons, where the movement of the free electrons is affected by electric and magnetic fields, and collisions between the plasma particles. An initial distribution of positive ions and free electrons within a plasma, measured at an arbitrary "start" time, is subject to change in response to the effects of electric and magnetic fields. If the initial distribution of positive ions and free electrons within the plasma is known, conventional calculations may be executed to determine a distribution of the positive ions and the free electrons in the plasma at a subsequent point in time.

The calculation of a plasma particle distribution offers significant insight into wave-particle interactions. However, directly calculating the distribution of positive ions and free electrons in a plasma is extremely computationally-intensive. For example, executing the calculation may require hundreds of thousands of processors executing in a clustered architecture, and may consume several megawatts of power. Accordingly, it would be advantageous to be able to reduce the computational complexity of determining a plasma particle distribution for collisional plasmas.

Aspects and embodiments are directed to a non-linear optical model of collisional plasma dynamics. The non-linear optical model includes a medium, and a laser beam that is directed through the medium. The medium is a non-linear optical medium, such as a non-linear crystal material, for example. As discussed in greater detail below, the laser beam interacts with medium in a manner similar to the interaction of an electromagnetic wave with a plasma. Accordingly, the optical model may be used to simulate the effect of an electromagnetic wave on a plasma. Where the initial distribution of the plasma and properties of the electromagnetic wave are known, the optical model may be used to determine a particle distribution in the plasma subsequent to the electromagnetic wave being applied to the plasma.

More specifically, the phase and amplitude of a laser beam encode information indicative of a particle distribution in the plasma. In one example, the phase and amplitude of the incident laser beam encode an initial distribution of particles within the plasma. As the laser beam passes through the non-linear optical medium, the beam interacts with the medium in a manner analogized to the manner in which an electric field interacts with plasma particles. The emergent laser beam is measured to determine a change in phase and amplitude, which is analyzed to determine an analogous change in plasma particle distribution. In some examples, the emergent laser beam is indicative of an electron distribution in plasma, whereas the ion distribution in the plasma is assumed to be relatively fixed.

Figure 1:
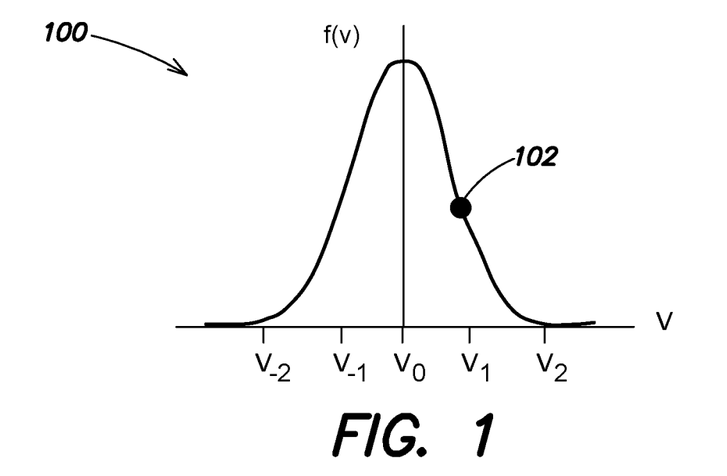
FIG. 1 is a graph showing a distribution function in a plasma system.

FIG. 1 illustrates a distribution function 100 of particles in a plasma. The horizontal axis of the distribution function 100 represents a particle velocity, including arbitrary velocity values $v_{-2}$, $v_{-1}$, $v_0$, $v_1$, and $v_{-2}$. The vertical axis of the distribution function 100 represents a probability of a particle existing at a corresponding velocity. The particles are assumed to be in thermodynamic equilibrium, yielding a Maxwellian distribution function governed by Equation (1), $$f(v) = e^{-\frac{mv^2}{2k_B T}} \qquad (1)$$

where m is a particle mass, v is a particle velocity, $k_B$ is Boltzmann's constant, and T is a plasma temperature.

When an electromagnetic wave is provided to the plasma, the electromagnetic wave exchanges energy with the plasma particles with which the wave interacts. More specifically, the electromagnetic wave tends to lose energy to plasma particles moving more slowly than the wave, and gains energy from plasma particles moving more quickly than the wave. For example, consider an electromagnetic wave having a phase velocity of $v_1$ applied to the plasma. Per the probability distribution function 100 shown in FIG. 1, the point 102 corresponds to the probability of the plasma particles having the phase velocity $v_1$. As illustrated by FIG. 1, in this example, there is a higher probability that the electromagnetic wave encounter particles moving at velocities slower than $v_1$ than particles moving at velocities faster than $v_1$. In graphical terms, the area of the distribution function 100 to the left of $v_1$ is greater than the area of the distribution function 100 to the right of $v_1$. Thus, because in this example there are, on average, more plasma particles moving slower than the electromagnetic wave than there are plasma particles moving faster than the electromagnetic wave, the electromagnetic wave experiences a net decrease in energy. This is a phenomenon known as Landau damping, representative of the damping effect experienced by the wave.

An analogous phenomenon can be demonstrated in the case of a laser beam propagating through a non-linear optical medium, such as a non-linear crystal. The laser beam includes a plurality of "speckles" that are regions of high optical intensity in the beam caused by constructive interference. As discussed above, a plasma includes plasma ions and free plasma electrons that are small in comparison to the plasma ions. As discussed in more detail below, for the simulation and modeling purposes disclosed herein, the speckles in the laser beam can be considered analogous to the free plasma electrons, and the electrons of the non-linear crystal can be considered analogous to the plasma ions. The crystal electrons are large and static in comparison to the speckles in the same way that the plasma ions are large and static in comparison to the plasma free electrons.

Figure 2:
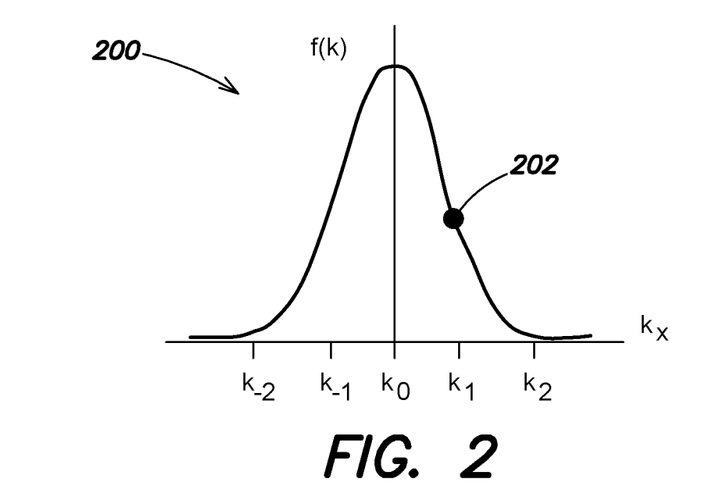
FIG. 2 is a graph showing a distribution function in an optical system.

FIG. 2 illustrates a probability distribution function 200 of speckles in an optical beam such as a laser beam. The horizontal axis of the probability distribution function 200 represents an optical wavenumber, including arbitrary wavenumber values $k_{-2}$, $k_{-1}$, $k_0$, $k_1$, and $k_{-2}$. The vertical axis of the distribution function 200 represents a probability of a speckle existing at a corresponding wavenumber. The speckles in the distribution function 200 are assumed to be in quasi-thermal equilibrium, yielding a Maxwellian distribution function governed by Equation (2), $$f(k) = e^{-\frac{k_x^2}{\Delta k^2}} \quad (2)$$

where k is a wavenumber, and x is an integer. In this example, point 202 corresponds to the probability of a speckle having a wavenumber $k_1$. Similar to the effects of Landau damping in a plasma system, in this example, the speckle at the wavenumber $k_1$ experiences a net decrease in energy as it propagates in the non-linear optical medium. As discussed in greater detail below, the similar Landau-like damping effect is related to partial wave incoherence as the speckles interact with the medium. The similar damping effects observed with an electromagnetic wave in a plasma and a speckle in a crystal provides a so-called "physical interface" between the two systems.

The physical interface may also extend to the effects of collisions between plasma particles, such as electrons. Each collision between two particles alters the velocity of the colliding particles, and the collision frequency may be defined as the inverse of the time that it takes for the velocity to change to a 90° deflection. Collisions may be modeled using a Fokker-Planck operator, which is a diffusion operator in velocity space and may be simpler than the Boltzmann operator used in neutral gas theory. Modeling the collisional effects may be achieved using the Vlasov equation, $$\frac{\delta f}{\delta t} + \vec{v} \cdot \nabla f + \vec{a} \cdot \nabla_v f = \left(\frac{\delta f}{\delta t}\right)_c \quad (3)$$

where f is the particle density function, $\vec{v}$ is the particle velocity, $\vec{a}$ is the acceleration caused by external electric and magnetic forces, and $$\left(\frac{\delta f}{\delta t}\right)_c$$

is a collision operator. The collision operator may be implemented according to one of several collision operators. A first example of a collision operator is, $$\left(\frac{\delta f}{\delta t}\right)_c = \nu f \quad (4)$$

where $\nu$ is the collision frequency. A second example of a collision operator is, $$\left(\frac{\delta f}{\delta t}\right)_c = \nu(f - f_u) \quad (5)$$

where $f_u$ is the Maxwellian distribution. Equation (5) is derived from the intuitive concept that collisions relax the particle distribution function to the Maxwellian distribution. A third example of a collision operator is the Lenard-Bernstein operator, $$\left(\frac{\delta f}{\delta t}\right)_c = \nu \frac{\delta}{\delta \vec{v}} \cdot \left[\vec{v}(f - f_u) + v_{th}^2 \frac{\delta}{\delta \vec{v}}(f - f_u)\right] \quad (6)$$

where $v_{th}$ is the thermal distribution of velocity. Accordingly, Equation (3) may be executed in connection with any of Equations (4)-(6) to model the effects of plasma particle collisions and to extend the physical interface between optical and plasma systems.

This interface between the systems allows physical properties of one of the systems to be mapped to respective physical properties of the other system. More specifically, as discussed above, speckles in a laser beam propagating through a non-linear crystal may be analogized to electrons in plasma, and electrons in the non-linear crystal may be analogized to positive ions in the plasma. Accordingly, where a laser beam is incident on the non-linear crystal, the distribution of the speckles in the incident beam may be compared to the distribution of speckles in the emergent beam to approximate a distribution of electrons and ions in an analogous plasma system. This relationship provides a mechanism for modeling the behavior of plasma in response to certain conditions.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

A fundamental set of coupled equations describing 3D optical wave propagation in a dispersive or diffractive medium can be expressed using the coupled equations, $$i\left(\frac{\delta}{\delta t} + v_g \cdot \nabla \Psi\right)\Psi + \frac{\beta}{2}\nabla^2 \Psi + n\Psi = 0 \tag{7}$$

$$\tau_m \frac{\delta n}{\delta t} + n = \kappa G(\langle \Psi^* \Psi \rangle) \tag{8}$$

where $\Psi(r, t)$ is the slowly-varying complex amplitude as a function of the evolution dispersive variable t and the spatial dispersive variable r, $v_g$ is the group velocity, $\nabla$ is the gradient operator, $\beta$ is the diffraction or second-order dispersion coefficient, $\kappa$ is a non-linear coefficient, $\tau_m$ is the medium relaxation time, n(t, r) is the non-linear response function of the medium, and G(•) characterizes the non-linear properties of the medium, where the angled bracket notation denotes the statistical ensemble average.

Assuming that the medium relaxation time $\tau_m$ is significantly longer than the characteristic time of the statistical wave intensity fluctuations $\tau_s$, and is much less than the characteristic time scale of the wave amplitude variation $\tau_p$ (i.e., $\tau_s \ll \tau_m \ll \tau_p$), Equations (7) and (8) may be reduced to, $$i\frac{\delta \Psi}{\delta t} + \frac{\beta}{2}\nabla^2 \Psi + \kappa G(\langle \Psi^* \Psi \rangle)\Psi = 0 \tag{9}$$

where the coordinate system of Equation (9) has been transformed to the reference system moving with the phase velocity $v_g$.

Equation (9) may be transformed between phase space and Hilbert space using the Wigner transform, which is used to describe the dynamics of a quantum state of a system in classical space language. The Wigner transform (including the Klimontovich statistical average) may be expressed as, $$\rho(p, r, t) = \frac{1}{(2\Pi)^3}\int_{-\infty}^{\infty} d^3\xi e^{ip\cdot\xi}\left\langle \Psi^*\left(r + \frac{\xi}{2}, t\right)\Psi\left(r - \frac{\xi}{2}, t\right)\right\rangle \tag{10}$$

where $\rho(p, r, t)$ represents the Wigner coherence function. The Wigner coherence function is a particle density function describing system points' momentum p and position r, with respect to time t. Equation (10) may be applied to Equations (7) and (8) to yield, $$\frac{\delta \rho}{\delta t} + \beta p \cdot \frac{\delta \rho}{\delta r} + \kappa \frac{\delta G(\langle |\Psi|^2 \rangle)}{\delta r} \cdot \frac{\delta \rho}{\delta p} = 0 \tag{11}$$

Taking the derivative of Equation (11) yields, $$\frac{\delta \rho}{\delta t} = \frac{1}{(2\pi)^3}\int e^{ip\cdot\xi}\left\langle \frac{\delta \Psi^*\left(r + \frac{\xi}{2}, t\right)}{\delta t}\Psi\left(r - \frac{\xi}{2}, t\right)\right\rangle d^3\xi + \tag{12}$$

$$\frac{1}{(2\pi)^3}\int e^{ip\cdot\xi}\left\langle \Psi^*\left(r + \frac{\xi}{2}, t\right)\frac{\delta \Psi\left(r - \frac{\xi}{2}, t\right)}{\delta t}\right\rangle d^3\xi$$

Equation (9) may be written as, $$\frac{\delta \Psi(r, t)}{\delta t} = \frac{i\beta}{2}\nabla^2 \Psi + i\kappa G\Psi \tag{13}$$

Combining Equations (12) and (13) yields, $$\frac{\delta \rho}{\delta t} = \frac{\delta \rho T}{\delta t} + \frac{\delta \rho G}{\delta t} \tag{14}$$

Generally speaking, the first term of Equation (14) indicates a real response, and the second term of Equation (14) indicates a complex response, which may be analyzed to model collisional effects of plasma. Analyzing each term of Equation (14) individually yields, $$\frac{\delta \rho T}{\delta t} = \frac{\beta}{2i(2\pi)^3}\int e^{ip\cdot\xi}\left\langle \nabla^2\Psi^*\left(r + \frac{\xi}{2}, t\right)\Psi\left(r - \frac{\xi}{2}, t\right)\right\rangle d^3\xi - \tag{15}$$

$$\frac{\beta}{2i(2\pi)^3}\int e^{ip\cdot\xi}\left\langle \Psi^*\left(r + \frac{\xi}{2}, t\right)\nabla^2\Psi\left(r - \frac{\xi}{2}, t\right)\right\rangle d^3\xi$$

and $$\frac{\delta \rho G}{\delta t} = \tag{16}$$

$$\frac{\kappa}{i(2\pi)^3}\int e^{ip\cdot\xi}\left\langle \left[G^*\left(r + \frac{\xi}{2}\right) - G\left(r - \frac{\xi}{2}, t\right)\right]\Psi^*\left(r + \frac{\xi}{2}\right)\Psi\left(r - \frac{\xi}{2}, t\right)\right\rangle d^3\xi$$

Integrating Equation (16) by parts, the first term becomes $$\frac{\delta \rho T}{\delta t} = -\beta p \frac{\delta \rho}{\delta r} \quad (17)$$

With respect to the second term, let $G(r)=G_r(r)+iG_i(r)$. Expanding $G(r)$ around r using Taylor series yields, $$G_r\left(r+\frac{\xi}{2}\right) - G_r\left(r-\frac{\xi}{2}\right) = \sum_n \frac{1}{(2n+1)!} \frac{1}{2^{2n}} \frac{\delta^{2n+1}G_r(r)}{\delta r^{2n+1}} \xi^{2n+1} \quad (18)$$

and $$G_i\left(r+\frac{\xi}{2}\right) - G_i\left(r-\frac{\xi}{2}\right) = \sum_n \frac{1}{(2n)!} \frac{1}{2^{2n}} \frac{\delta^{2n}G_i(r)}{\delta r^{2n}} \xi^{2n} \quad (19)$$

Equations (18) and (19) may be rewritten to yield, $$\frac{\delta \rho G}{\delta t} = \quad (20)$$

$$-2\kappa G_r(r)\sin\left(\frac{1}{2}\frac{\overleftarrow{\delta}}{\delta r} \cdot \frac{\overrightarrow{\delta}}{\delta p}\right)\rho(p,r,t) - \left(2i\kappa G_i(r)\cos\left(\frac{1}{2}\frac{\overleftarrow{\delta}}{\delta r} \cdot \frac{\overrightarrow{\delta}}{\delta p}\right)\rho(p,r,t)\right)$$

where the notation $\overleftarrow{\delta}$ indicates that the derivative acts on the left function and the notation $\overrightarrow{\delta}$ indicates that the derivative acts on the right function. Combining Equations (14), (17), and (20) and ignoring higher-order derivatives yields, $$\frac{\delta \rho}{\delta t} + \beta p \frac{\delta \rho}{\delta r} + \kappa \frac{\delta G(r)}{\delta r} \frac{\delta \rho}{\delta p} + i\kappa G_i(r)\rho + i\kappa \frac{\delta^2 G(r)}{\delta r^2} \frac{\delta^2 \rho}{\delta p^2} = 0 \quad (21)$$

Equation (21) may be implemented to provide a non-linear optical model for collisional plasmas. As discussed above, observation of Landau-like damping effects in optical systems offers insight into an interface between optical and plasma systems. This bridge is further expanded by the observation of two-stream (or "bump-on-tail") instability effects in optical systems. Two-stream instability is a well-known instability phenomenon in plasma systems, which is caused by the injection of a stream of electrons into a plasma. The injection of the stream of electrons causes plasma wave excitation in a phenomenon that is, conceptually, the inverse of Landau damping. Whereas in the case of Landau damping the existence of a greater number of particles that move slower than the wave phase velocity leads to an energy transfer from the wave to the particles, in the case of two-stream instability, the velocity distribution of an injected stream of electrons has a "bump" on its "tail." If a wave has phase velocity in the region where the slope is positive, there is a greater number of faster particles than slower particles, and so there is a greater amount of energy being transferred from the fast particles to the wave, leading to exponential wave growth.

Similar effects may be observed in an optical system as a result of the dynamic coupling of two partially-coherent optical beams in a self-focusing photorefractive medium. Using wave-kinetic theory, the two-stream dynamics are interpreted as the resonant interaction of light speckles with interaction waves, similar to the interaction of a plasma with an injected stream of electrons.

The physical interface discussed above enables certain plasma system properties to be mapped to corresponding optical system properties. More specifically, according to certain embodiments, plasma quantum properties can be mapped to optical quantum properties, as discussed further below.

Electron density in a plasma system is subject to plasma oscillations. Quantization of the plasma oscillation yields a quasiparticle known in the art as a plasmon, which reflects electron behavior in the plasma. As discussed above, lasers include packets of photons referred to as speckles, which may be analogously modelled as quasiparticles. For example, it may be desirable to determine one or more properties of a plasmon in a plasma system. Rather than directly computing properties of the plasmon, Equation (21) may be executed with respect to a speckle in an optical system and mapped to corresponding properties of the plasmon. This provides a less expensive and more convenient way to model plasmas.

Accordingly, Equation (21) provides a mathematical relationship mapping speckles and electrons in an optical system to electrons and ions in a plasma system, respectively. Equation (21) includes complex terms which, as discussed above, may be analyzed to model the effects of plasma particle collisions. An optical material capable of producing a complex response may therefore be selected to preserve the complex response function of Equation (21) and model the collisional effects of the plasma.

Certain materials are naturally capable of producing a complex response. For example, fluorescein dye in glass has a third order susceptibility of $0.035(1+i)$ $cm^2/W$. However, implementing materials which naturally produce a complex response may not be ideal at least because the real and complex responses are fixed, which may make tuning the optical system difficult or impossible. Accordingly, it may be advantageous to implement a material having a tunable complex response function. For example, a material having a two-level atom with a third non-radiatively coupled level may be implemented to provide a tunable complex response function.

Figure 3:
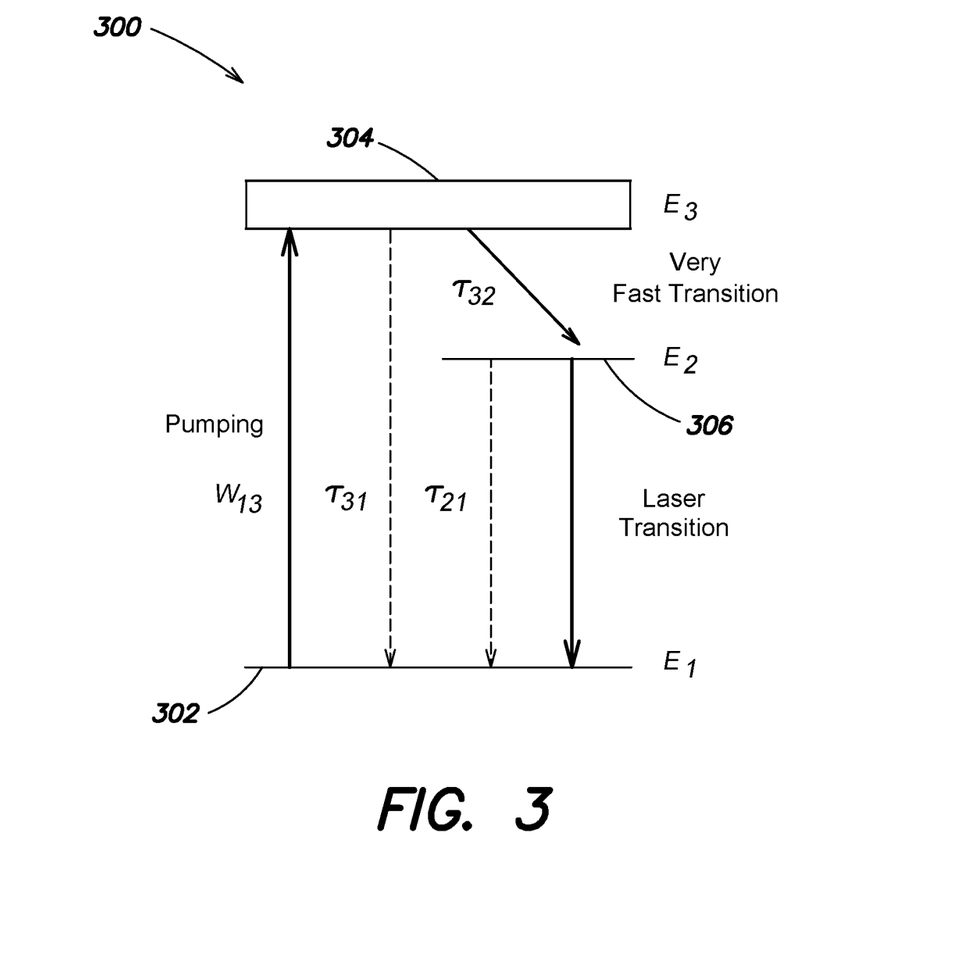
FIG. 3 is a schematic diagram of an optical medium according to one embodiment.

FIG. 3 illustrates a schematic diagram of an optical medium 300 according to an embodiment. The optical medium 300 may be configured to produce a complex response to incident light. For example, the optical medium 300 may include a non-linear crystal to produce a complex response, as discussed in greater detail below. The optical medium 300 includes a first energy level 302, a second energy level 304, and a third energy level 306.

At a first time, a particle in the optical medium 300 (for example, an electron) exists in the first energy level 302. At a second time, electromagnetic radiation is provided to the optical medium 300 and excites the particle. For example, a pump beam provided by a pump beam generator may be incident on the optical medium 300 to excite the particle. Responsive to receiving the electromagnetic radiation, the particle is excited to the second energy level 304.

At a third time, the particle transitions to the third energy level 306. The transition from the second energy level 304 to the third energy level 306 may occur shortly after the second time, as the second energy level 304 may be a less stable energy level as compared to the third energy level 306 for the particle. At a fourth time, the particle transitions from the third energy level 306 to the first energy level 302. The particle may emit a photon during the transition from the third energy level 306 to the first energy level 302.

The optical medium 300 may be at least partially characterized by a phase damping rate $T_1$ and a dephasing time $T_2$. The phase damping rate $T_1$ is indicative of a rate at which a particle at the second energy level 304 decays to the first energy level 302. The dephasing time $T_2$ is indicative of a time that a pure state at any energy level takes to mix. Accordingly, the dephasing time $T_2$ indicates a time after electromagnetic radiation is pumped into the optical medium at which the quantum states for all particles are averaged out. By modeling the optical medium 300 according to the phase damping rate $T_1$ and the dephasing time $T_2$, the complex non-linear response function is, $$G = G_r + iG_i \quad (22)$$

where $$G_r = \frac{\alpha(0)}{\omega_{bc}} \frac{\Delta T_2}{1 + \Delta^2 T_2^2 + \Omega^2 T_1 T_2} \quad (23)$$

and $$G_i = \frac{\alpha(0)}{\omega_{bc}} \frac{1}{1 + \Delta^2 T_2^2 + \Omega^2 T_1 T_2} \quad (24)$$

where $\alpha(0)$ is the absorption coefficient at zero damping, $\Omega$ is the on-resonance frequency, $\Delta$ is the detuning frequency, and $\omega$ is the difference in frequency of the second energy level 304 and the third energy level 306.

The on-resonance frequency $\Omega$ and the detuning frequency $\Delta$ may be tunable parameters of a pump beam generator. For example, the pump beam generator may be configured to provide a pump beam to an optical medium, such as the optical medium 300. The on-resonance frequency $\Omega$ may be expressed as, $$\Omega = 2|\mu_{ba}||E|/\hbar \quad (25)$$

where $\mu_{ba}$ is the off-diagonal term in the interaction Hamiltonian and E is a field intensity of the pump beam. The detuning frequency $\Delta$ may be expressed as, $$\Delta = \omega - \omega_{ba} \quad (26)$$

where $\omega$ is the frequency of the pump beam, and $\omega_{ba}$ is the difference in frequencies between the second energy level 304 and the first energy level 302.

Accordingly, as provided by Equations (25) and (26), the on-resonance frequency $\Omega$ and the detuning frequency $\Delta$ may be tuned by modulating properties (for example, the field intensity E and the frequency $\omega$) of electromagnetic radiation provided to the optical medium 300 which, in turn, enables modulation of the complex non-linear response function as discussed above with respect to Equations (22)-(24). As discussed above, the electromagnetic radiation provided to the optical medium 300 may be generated and provided by a pump beam generator. Therefore, the complex response function may be modulated by tuning the pump beam generator.

Alternately or in addition, the complex response function may be tuned by varying a linear absorption coefficient of the optical medium 300, thereby modulating the relationship between the phase damping rate $T_1$ and the dephasing time $T_2$. Varying the relationship between the phase damping rate $T_1$ and the dephasing time $T_2$ may be accomplished by modulating properties of the optical medium 300, rather than modulating properties of the pump beam provided by the pump beam generator. For example, spatial variation of the complex response function may be provided in a direction of optical propagation in the optical medium 300 by arranging atoms in the optical medium 300 to have varying resonance frequencies in the direction of optical propagation.

A linear absorption coefficient $\gamma_c$ of the optical medium 300 may be expressed as, $$\gamma_c = C_s N + C_f N_f \quad (27)$$

where $C_s$ is the coefficient of self-broadening, N is the number densities of atoms, $C_f$ is the coefficient of self-broadening in foreign atoms, and $N_f$ is the number density of foreign atoms. Modulating the linear absorption coefficient $\gamma_c$ may modulate a relationship between the phase damping rate $T_1$ and the dephasing time $T_2$ according to the relationship, $$\frac{1}{T_2} = \frac{1}{2T_1} + \gamma_c \quad (28)$$

Accordingly, the relationship between the phase damping rate $T_1$ and the dephasing time $T_2$ may be spatially varied by modulating the properties N, $N_f$, $C_s$, and $C_f$ of the optical medium 300 with respect to a direction of optical propagation. For example, the properties N, $N_f$, $C_s$, and $C_f$ of the optical medium 300 may be modulated by injecting, by a feedback module, foreign atoms into the optical medium 300.

Figure 4:
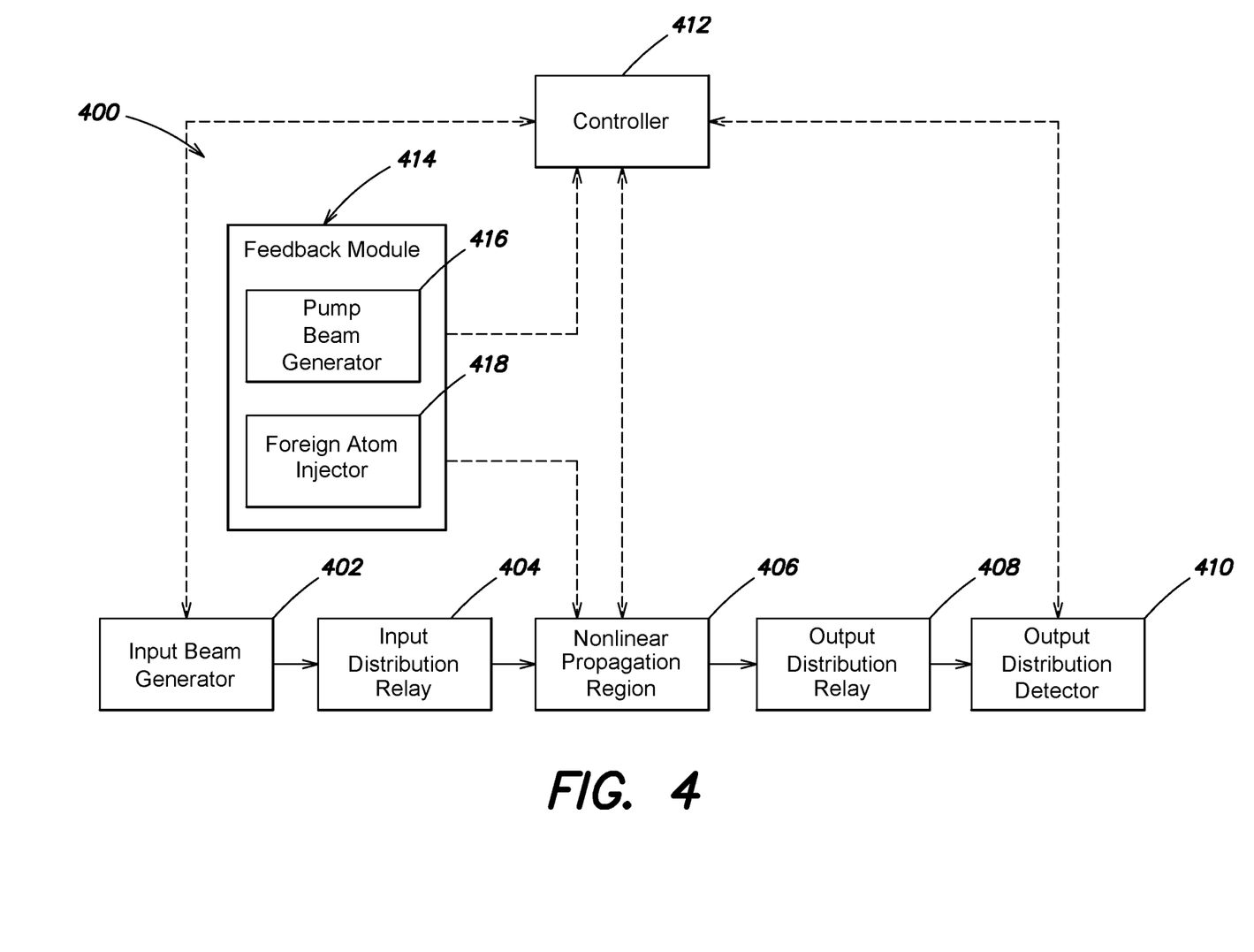
FIG. 4 is a block diagram of an optical system according to one embodiment.

FIG. 4 illustrates an optical system 400 according to one embodiment. The optical system 400 is capable of modelling plasma dynamics in part by selecting parameters of an input laser beam, providing the input laser beam to a medium configured to produce a non-linear complex response function, and detecting parameters of an output laser beam. A change in the parameters of the laser beam after interacting with the medium is analyzed to determine a change in a speckle distribution function. The results of the analysis are used to model an analogous change in dynamic plasma distribution parameters, where laser beam speckles are analogous to electrons in plasma and the electrons of the medium are analogous to ions in plasma.

Referring to FIG. 4, the optical system 400 includes an input beam generator 402, an input distribution relay 404, a non-linear propagation region 406, an output distribution relay 408, an output distribution detector 410, a controller 412, and a feedback module 414. The feedback module 414 includes a pump beam generator 416 and a foreign atom injector 418.

An output of the input beam generator 402 is coupled to the input distribution relay 404, and is the input beam generator 402 is further coupled to the controller 412. An input of the input distribution relay 404 is coupled to the input beam generator 402, and an output of the input distribution relay 404 is coupled to the non-linear propagation region 406. An input of the non-linear propagation region 406 is coupled to the input distribution relay 404 and an output of the non-linear propagation region 406 is coupled to the output distribution relay 408, and the non-linear propagation region 406 is further configured to be coupled to the controller 412 and the feedback module 414.

An input of the output distribution relay 408 is coupled to the non-linear propagation region 406, and an output of the output distribution relay 408 is coupled to the output distribution detector 410. An input of the output distribution detector 410 is coupled to the output distribution relay 408, and the output distribution detector 410 is configured to be coupled to the controller 412. The controller 412 is configured to be coupled to the input beam generator 402, the non-linear propagation region 406, the output distribution detector 410, and the feedback module 414. The feedback module 414 is configured to be coupled to the non-linear propagation region 406 and the controller 412.

In one example, the input beam generator 402 is a laser beam generator configured to generate an input laser beam with parameters specified according to one or more control signals received from the controller 412. In alternate embodiments, the input beam generator 402 may be configured to generate other types of electromagnetic radiation other than a laser beam in alternate examples. Furthermore, in some embodiments, the input beam generator 402 may select the parameters itself, and communicate one or more signals to the controller 412 notifying the controller 412 of the parameter selection.

The parameters may be indicative of a speckle distribution in the laser beam, analogous to free electron distribution in a plasma. The initial parameters of the input laser beam can be specified by the controller 412 to represent an initial distribution of electrons in a plasma system, for example. The input beam generator 402 generates the laser beam according to the received control signal(s), or according to a parameter selection made by the input beam generator 402, and provides the input laser beam to the input distribution 404 subsequent to generating the beam.

The input distribution relay 404 is generally configured to receive the input laser beam from the input beam generator 402, adjust the width and direction of the input laser beam, and provide the adjusted laser beam to the non-linear propagation region 406. For example, the input distribution relay 404 may include a refractive lens configured to collect the laser beam and adjust the laser beam to a desired width. The function of the input distribution relay 404 is to ensure that the input laser beam is incident on the non-linear propagation region 406 at an intended width and position.

In one embodiment, the non-linear propagation region 406 includes a non-linear crystal configured to receive the adjusted laser beam from the input distribution relay 404, modulate parameters of the laser beam, and provide the modulated laser beam to the output distribution relay 408. The electron structure of the non-linear propagation region 406 modulates the parameters of the laser beam analogously to the modulation of the free electron distribution in a plasma by the plasma ions.

Properties of the non-linear propagation region 406 may be modulated in response to one or more control signals received from one or both of the pump beam generator 416 and the foreign atom injector 418. The pump beam generator 416 is generally configured to generate a pump beam and provide the pump beam to the non-linear propagation region 406. For example, the pump beam may alter the energy state of one or more particles in the non-linear propagation region 406 as discussed above with respect to Equations (25) and (26). The foreign atom injector 418 may be configured to inject foreign atoms into the non-linear propagation region 406 to modulate a relationship between the phase damping rate $T_1$ and the dephasing time $T_2$ as discussed above with respect to Equations (27) and (28).

Changes to the properties of the non-linear propagation region 406 correspondingly affect the modulation of the parameters of the laser beam interacting with the non-linear propagation region 406. The non-linear propagation region 406 provides the modulated laser beam to the output distribution relay 408.

The output distribution relay 408 is generally configured to receive the modulated laser beam from the non-linear propagation region 406, adjust the width and direction of the modulated laser beam, and provide the adjusted laser beam to the output distribution detector 410. Similar to the input distribution relay 404, the output distribution relay 408 may include a refractive lens configured to provide the laser beam to the output distribution detector 410 at an intended width and position. In one example, the output distribution relay 408 may include a 4F system.

The output distribution detector 410 is generally configured to receive the adjusted laser beam from the output distribution relay 408 and detect the parameters of the adjusted laser beam. For example, the output distribution detector 410 may include a volume hologram configured to detect at least one of the phase and amplitude of the laser beam received from the output distribution relay 408.

In other embodiments, the output distribution detector 410 may employ linear tomography to detect parameters of the adjusted laser beam. In still other embodiments, any other known techniques for detecting desired parameters of electromagnetic radiation may be employed. The output distribution detector 410 communicates the detected parameters to the controller 412.

The controller 412 is generally configured to perform at least two functions. First, the controller 412 is configured to analyze changes in laser beam parameters resulting from interaction with the non-linear propagation region 406. In some examples, analysis includes specifying input parameters to the input beam generator 402, receiving output parameter measurements from the output distribution detector 410, and detecting a change between the laser beam parameters. The analyzed changes may be representative of changes in the speckle distribution function of the laser beam after interaction with the medium, which may be used to model changes in a collisional plasma distribution as discussed above.

Second, the controller 412 is configured to adjust system parameters of the optical system 400. For example, the controller 412 may communicate one or more signals to the input beam generator 402 to adjust parameters of the input laser beam, or may communicate one or more signals to the feedback module 414 to adjust parameters of the non-linear propagation region 406. As discussed above, adjustments to the pump beam generator 416 may include adjusting the electric field intensity E or the frequency co of the pump beam provided to the non-linear propagation region 406. Adjustments to the foreign atom injector 418 may include adjusting a distribution of foreign atoms injected into the non-linear propagation region 406.

Figure 5:
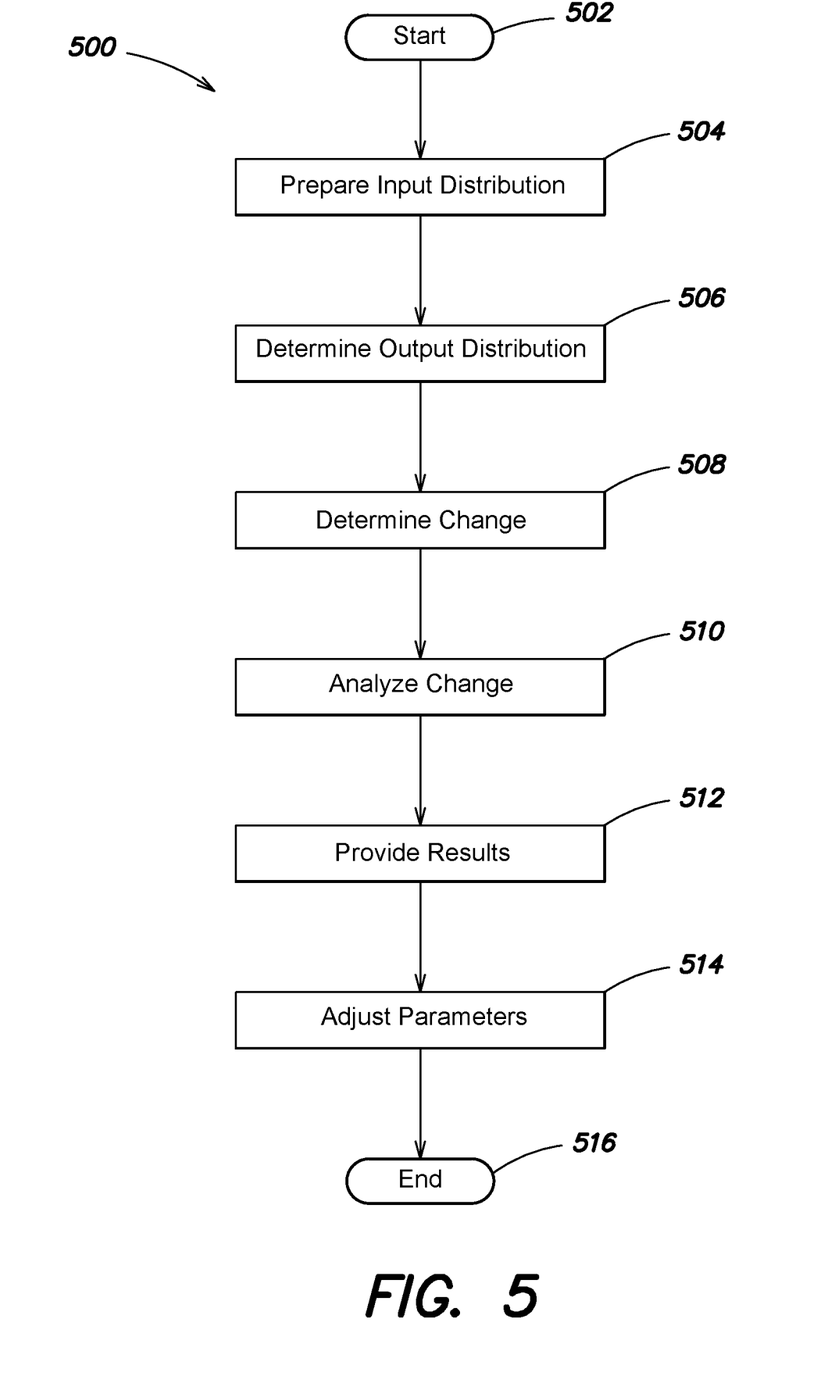
FIG. 5 is a flow diagram of a method of determining a distribution of plasma particles according to one embodiment.

FIG. 5 illustrates a method 500 of operating an optical system, such as the optical system 300. In some embodiments, the method 500 may be executed by a controller, such as the controller 412. At act 502, the process 500 begins. At act 504, an input distribution of an input laser beam is prepared by selecting one or more values of one or more beam parameters to provide to a beam generator. For example, with reference to FIG. 4, act 504 may include calculating phase and amplitude values for an input laser beam to provide to the input beam generator 402 where the phase and amplitude are representative of a speckle distribution function. The initial phase and amplitude values of the laser beam may be selected to model an initial distribution of electrons and ions in a plasma, for example. Alternatively, the controller may receive one or more values of the one or more parameters from the beam generator.

At act 506, the controller determines parameters of the laser beam output. For example, act 506 may include receiving one or more signals from an output detector, such as the output distribution detector 410, indicative of the parameters such as phase and amplitude. At act 508, the controller determines a change in the laser beam parameters. For example, act 508 may include determining a difference in the phase and amplitude detected at act 506 relative to the phase and amplitude selected at act 504.

At act 510, the controller analyzes the change determined at act 508. More specifically, act 510 may include correlating the change in the laser beam parameters to a modelled change in analogous plasma parameters. For example, where the change in the laser beam parameters is indicative of a change in a speckle distribution function of the laser beam, the change in the speckle distribution function may be used to model a change in the particle distribution in an analogous plasma system. It is to be appreciated that, in executing act 510, the controller may be utilizing one or more of the mathematical relationships derived above with respect to Equation (21), such as by utilizing phase and amplitude information to determine a speckle distribution function p.

At act 512, the controller provides the results of the analysis at act 510 to an output. For example, the controller may provide the results to a user display. In other embodiments, the controller may store the results of the analysis in a local or remote storage in addition to, or in lieu of, providing the results to the user display.

At act 514, the controller adjusts system parameters responsive to a user input and/or responsive to a determination made by the controller. For example, the controller 412 may communicate one or more control signals to the pump beam generator 416 to change properties of the pump beam provided to the non-linear propagation region 406. Changing properties of the pump beam may include changing the field intensity E of the pump beam or the frequency co of the pump beam, as discussed above with respect to Equations (25) and (26).

Act 514 may further include the controller 412 communicating one or more control signals to the foreign atom injector 418 to change properties of the non-linear propagation region 406. Changing properties of the non-linear propagation region 406 may include varying a spatial distribution of foreign atoms in the non-linear propagation region 406, as discussed above with respect to Equations (23) and (24).

Alternatively, the controller 412 may communicate one or more control signals to the non-linear propagation region 406 to alter parameters of the non-linear propagation region 406. For example, where the non-linear propagation region 406 includes a pair of diffraction gratings or a pair of prisms, the controller 412 may alter an alignment of the pair of diffraction gratings or the pair of prisms. At act 516, the process 500 ends.

It is therefore to be appreciated that systems and methods been provided to model a distribution of particles in a collisional plasma system using optical parameters. A controller, such as the controller 412, may be implemented to detect one or more parameters of the optical system 300, and to model corresponding parameters in a plasma system.

In some examples, the controller 412 can include one or more processors or other types of controllers. The controller 412 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components. The controller 412 may include, or may be communicatively coupled to, a non-transitory computer-readable medium configured to store instructions which, when executed by the controller 412, cause the controller 412 to execute one or more acts discussed above with respect to FIG. 5.

In some embodiments, the controller 412 may be coupled to a display, a storage element, and one or more input/output modules. For example, the controller 412 may communicate results of the analysis of the optical system 300 to the display responsive to commands received from a user via the input/output modules, such that a user may view the results of the analysis. The controller 412 may also or alternatively store the results of the analysis in the storage element for subsequent retrieval.

Although the foregoing discussion has described the usage of laser beams, it is to be appreciated that any form of electromagnetic radiation may be implemented in alternate embodiments. For example, although the input beam generator 402 is described as generating a laser beam, in alternate embodiments the input beam generator 402 may generate any form of non-ionizing electromagnetic radiation.

Furthermore, although the foregoing discussion has been directed to utilization of an optical system to model plasma behavior, in alternate embodiments the optical system may model other behavior. For example, as discussed above, the Wigner spectral redistribution counteracts the MI similar to the non-linear propagation of electron plasma waves interacting with intense electromagnetic radiation. This counteraction is also similar to non-linear interaction between random phase photons and sound waves in electron-positron plasma, and the longitudinal dynamics of charged-particle beams in accelerators. Similar principles may also be applied to model other differential equations such as fluid and atmospheric dynamics.

Thus, an optical modelling solution has been described. The optical model may be utilized to simulate effects in analogous systems which would otherwise be extremely computationally-burdensome to compute. For example, the optical model may be used to model a distribution of electrons and ions in collisional plasma at a significantly-reduced computational cost.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical system for modeling a distribution of collisional plasma particles, the system comprising:
    an input beam generator configured to generate an input beam having a first set of values of at least one parameter, the first set of values of the one or more parameters modelling an initial distribution of particles in a collisional plasma;
    a non-linear optical medium configured to receive, from the input beam generator, the input beam, the nonlinear medium being configured to produce a complex response function in response to receiving the input beam;

an output detector configured to detect a second set of values of the at least one parameter responsive to propagation of the input beam through the non-linear medium to the output detector;

a feedback module coupled to the non-linear optical medium and configured to modify one or more properties of the non-linear optical medium; and a controller configured to select the first set of values of the at least one parameter, communicate the first set of values of the at least one parameter to the input beam generator, receive, from the output detector, the second set of values of the at least one parameter, and determine, based on the first set of values of the at least one parameter and the second set of values of the at least one parameter, a final distribution of the particles in the collisional plasma.

2. The system of claim 1, wherein the at least one parameter includes at least one of a phase of the input beam and an amplitude of the input beam.

3. The system of claim 1, wherein the controller is further configured to select a first set of values of a feedback parameter and provide, to the feedback module, the first set of values of the feedback parameter.

4. The system of claim 3, wherein the feedback module includes a pump beam generator configured to generate a pump beam, and provide the pump beam to the non-linear optical medium to modify the complex response function of the non-linear optical medium.

5. The system of claim 4, wherein the feedback parameter includes a frequency of the pump beam generated by the pump beam generator.

6. The system of claim 4, wherein the feedback parameter includes a field intensity of the pump beam generated by the pump beam generator.

7. The system of claim 3, wherein the feedback module includes a foreign atom injector configured to inject foreign atoms into the non-linear optical medium to modify the complex response function of the non-linear optical medium.

8. The system of claim 7, wherein the feedback parameter is indicative of a distribution of foreign atoms in the non-linear optical medium.

9. A method of modeling a distribution of collisional plasma particles, the method comprising:

selecting a first set of values of one or more parameters of an input beam, the one or more parameters modelling an initial distribution of particles in a collisional plasma;

communicating the first set of values of the one or more parameters to an input beam generator;

generating, by the input beam generator based on the first set of values of the one or more parameters, an input beam;

providing, by the input beam generator, the input beam to a non-linear optical medium configured to produce a complex response function in response to receiving the input beam;

propagating the input beam through the non-linear optical medium;

detecting a second set of values of the one or more parameters of the input beam responsive to propagation of the input beam through the non-linear optical medium;

analyzing the first set of values of the one or more parameters and the second set of values of the one or more parameters;

selecting, based on the analyzing, a first set of values of a feedback parameter;

providing the first set of values of the feedback parameter to a feedback module to modify a complex response function of the non-linear optical medium; and modelling, based on the analyzing, a final distribution of the particles in the collisional plasma.

10. The method of claim 9, wherein the one or more parameters include at least one of a phase of the input beam and an amplitude of the input beam.

11. The method of claim 9, further comprising generating, based on the first set of values of the feedback parameter, a pump beam, and providing the pump beam to the non-linear optical medium to modify the complex response function of the non-linear optical medium.

12. The method of claim 11, wherein the feedback parameter includes a frequency of the pump beam.

13. The method of claim 11, wherein the feedback parameter includes a field intensity of the pump beam.

14. The method of claim 9, further comprising injecting, based on the first set of values of the feedback parameter, foreign atoms into the non-linear optical medium to modify the complex response function of the non-linear optical medium.

15. The method of claim 14, wherein the feedback parameter is indicative of a distribution of foreign atoms.

16. A non-transitory computer-readable medium storing sequences of computer-executable instructions for modeling a distribution of collisional plasma particles, the sequences of computer-executable instructions including instructions that instruct at least one processor to:

select a first set of values of one or more parameters of an input beam, the one or more parameters modelling an initial distribution of particles in a collisional plasma;

communicate the first set of values of the one or more parameters to an input beam generator to control the input beam generator to generate, based on the first set of values of the one or more parameters, the input beam;

control the input beam generator to provide the input beam to a non-linear optical medium configured to produce a complex response function in response to receiving the input beam;

detect a second set of values of the one or more parameters of the input beam responsive to propagation of the input beam through the non-linear optical medium;

analyze the first set of values of the one or more parameters and the second set of values of the one or more parameters;

select a first set of values of a feedback parameter;

provide the first set of values of the feedback parameter to a feedback module to modify a complex response function of the non-linear optical medium; and model, based on the analyzing, a final distribution of the particles in the collisional plasma.

17. The computer-readable medium of claim 16, wherein the sequences of computer-executable instructions further include instructions that instruct the at least one processor to generate, based on the first set of values of the feedback parameter, a pump beam, and provide the pump beam to the non-linear optical medium to modify the complex response function of the non-linear optical medium.

18. The computer-readable medium of claim 17, wherein the feedback parameter includes at least one of a frequency of the pump beam and a field intensity of the pump beam.

19. The computer-readable medium of claim 16, wherein the sequences of computer-executable instructions further include instructions that instruct the at least one processor to control the feedback module to inject, based on the first set of values of the feedback parameter, foreign atoms into the non-linear optical medium to modify the complex response function of the non-linear optical medium.

20. The computer-readable medium of claim 19, wherein the feedback parameter is indicative of a distribution of foreign atoms.

\* \* \* \* \*